United States Patent
VanderZee

(10) Patent No.: US 9,398,490 B2
(45) Date of Patent: Jul. 19, 2016

(54) METHOD OF FRAGMENTING A MESSAGE IN A NETWORK

(71) Applicant: TRANE INTERNATIONAL INC., Piscataway, NJ (US)

(72) Inventor: Joel C. VanderZee, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 116 days.

(21) Appl. No.: 14/216,554

(22) Filed: Mar. 17, 2014

(65) Prior Publication Data

US 2014/0269772 A1 Sep. 18, 2014

Related U.S. Application Data

(60) Provisional application No. 61/794,234, filed on Mar. 15, 2013.

(51) Int. Cl.
*H04W 28/06* (2009.01)
*H04L 29/08* (2006.01)
*H04L 29/06* (2006.01)

(52) U.S. Cl.
CPC ........... *H04W 28/065* (2013.01); *H04L 69/324* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 7,970,010 B2 | 6/2011 | Denney et al. | |
| 8,279,892 B2 | 10/2012 | Denney et al. | |
| 8,300,544 B2 | 10/2012 | Schein | |
| 2005/0185632 A1* | 8/2005 | Draves et al. | 370/351 |
| 2005/0221752 A1* | 10/2005 | Jamieson | H04L 45/04 455/1 |
| 2006/0029002 A1* | 2/2006 | Park | H04L 29/12009 370/254 |
| 2006/0088042 A1* | 4/2006 | Shoham | H04W 4/12 370/401 |
| 2006/0126505 A1 | 6/2006 | Denney et al. | |
| 2007/0195817 A1 | 8/2007 | Denney et al. | |
| 2008/0056261 A1* | 3/2008 | Osborn | H04L 12/2834 370/392 |
| 2011/0051652 A1* | 3/2011 | Kubo | H04L 45/34 370/315 |
| 2012/0063385 A1* | 3/2012 | Yang | H04L 67/26 370/315 |
| 2013/0010625 A1 | 1/2013 | Schein | |
| 2013/0070745 A1* | 3/2013 | Nixon | H04L 45/74 370/338 |
| 2013/0070784 A1 | 3/2013 | Denney et al. | |
| 2014/0016544 A1* | 1/2014 | Chan | H04W 84/18 370/328 |

FOREIGN PATENT DOCUMENTS

WO WO 2011154051 A1 * 12/2011

OTHER PUBLICATIONS

Wu, ZigBee Source Route Technology in Home Application, Sensor Networks, Ubiquitous and Trustworthy Computing, 2008. SUTC '08. IEEE International Conference on, Jun. 11-13, 2008, pp. 302-305.*

Kasraoui et al., Improvement of Zigbee Routing Protocol, 2012 IEEE International Conference on Green Computing and Communications, Nov. 23, 2012, pp. 788-793.*

* cited by examiner

*Primary Examiner* — Benjamin H Elliott, IV
*Assistant Examiner* — Eric Nowlin
(74) *Attorney, Agent, or Firm* — Hamre, Schumann, Mueller & Larson, P.C.

(57) ABSTRACT

Embodiments described herein provide a method of fragmenting a large message into, for example, numbered packets for sending the message in a packet based communication system, such as in a ZigBee wireless network. Each packet may have a predetermined size and may include a MAC address, a network header of a variable size, and fragmented message data. The fragmented message data can be configured to be smaller than the available space in the packet so that the packet can be sent, for example, when the size of the header increases.

13 Claims, 1 Drawing Sheet

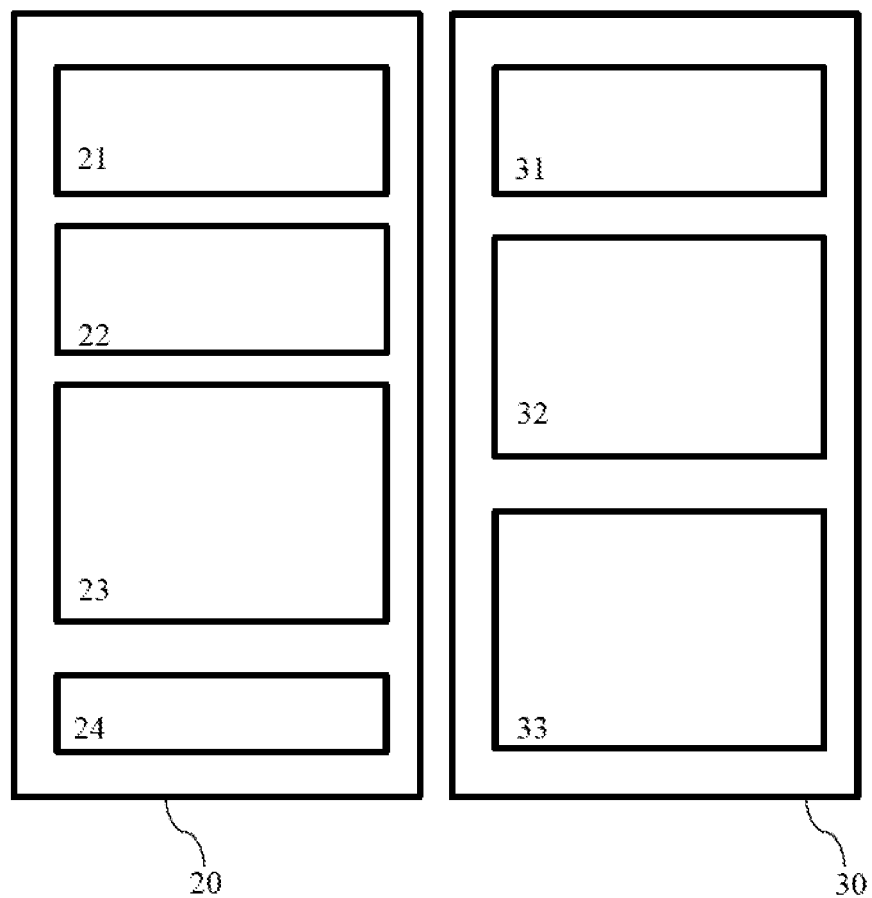

METHOD OF FRAGMENTING A MESSAGE IN A NETWORK

FIELD

The disclosure relates to a method of fragmenting a message in a packet-based communication system, such as a ZigBee wireless network.

BACKGROUND

In a packet-based communication system, a message that is too large to fit in a single packet can be fragmented, sent in separate packets, and reassembled after receiving. In some communication systems, such as in a communication system in which the fragments are numbered and reassembled by numbers, when a size of the first fragment is determined, all of the numbered fragments may have the same size.

A ZigBee wireless network protocol uses the IEEE 802.15.4 MAC protocol. The ZigBee wireless network may be configured to communicate a large message in the wireless network by sending and reassembling numbered fragments, each of which may have the same size. In the ZigBee wireless network, a packet may include a media access control (MAC) header, a network header, and data such as a fragment of a message.

SUMMARY

Embodiments as disclosed herein generally provide a method to fragment a message in a communication system, e.g. a ZigBee wireless network, so that a relatively large message can be sent over the communication system.

Generally, when setting a fragment size for fragmenting a message, for example, in a ZigBee network, a sender may use source routing, and set the size of the fragment to be smaller than an available space in a packet, so that subsequent packets can be sent when, for example, the available space shrinks as a result of a new or longer source route.

In some embodiments, a method of sending a message in a packet-based network may include determining an available space in a first packet; determining a fragmented message size for fragmenting the message that is smaller than the available space; fragmenting the message into at least one numbered fragmented message, each of the at least one numbered fragmented message has the fragmented message size; assembling a first fragmented message into a first packet; and sending the first packet.

In some embodiments, the packet may also include a MAC header and a network header. In some embodiments, the packet based network may be a ZigBee network.

In some embodiments, the message may be an application of a building control system.

Other features and aspects of the embodiments will become apparent by consideration of the following detailed description and accompanying drawings.

BRIEF DESCRIPTION OF THE DRAWINGS

Reference is now made to the drawings in which like reference numbers represent corresponding parts throughout.

FIGURE illustrates a method of fragmenting a message.

DETAILED DESCRIPTION

In certain situations, it may be necessary and/or desired to send a relatively large message over the network. When, for example, using a ZigBee network to establish a building control network based on, for example, a BACnet protocol, it may be necessary and/or desired to send a relatively large message (e.g. an application of the building control network) over the ZigBee network.

In a packet backed communication system, such as in the ZigBee wireless network, a message (e.g. an application) that are too large to fit into a single packet can be fragmented into one or more fragments, sent in one or more packets and reassembled after the multiple packets being received.

In the ZigBee network, for example, each fragment of the message data is identified by a number. Each fragment of the message can also include a total number of fragments for the message. When the fragments of the message are assembled by number, a size of each fragment may be determined by the initial fragment, and all the subsequent fragments may have the same size as the initial fragment. By setting all the fragments to the same size, the position of any message fragment can be easily calculated from its number and size for reassembly of the complete message.

The packet may include, for example, a MAC header, a network header and/or the fragmented message data. All these data have to fit into the packet.

Some networks, such as the ZigBee network, allow the node(s) of the network to transfer packets up to a predetermined maximum size. Typically, there are two methods of maintaining routes through a mesh of nodes in a ZigBee network. When the data in a network tends to be exchanged between one or a few particular nodes and the other nodes (many-to-one route), a possible routing method may involve source routing from those particular nodes, known as "concentrators". Source routes can take extra space in the network header of the packet compared to non-source-routed packets, and the space taken may increase with the number of nodes in the source route.

After each packet or some number of packets have been transmitted, a receiver in the ZigBee network can send an acknowledgment back to a sender in the ZigBee network. If the many-to-one route has been updated (by the periodically broadcast many-to-one route request from the concentrator), the receiver of a packet from a concentrator will send along with the acknowledgment a route-record message that updates the source route to be used by the concentrator.

If a sender has no source route for a destination, it may use the other routing method (ad-hoc on-demand distance vector, AODV) to send the first packet, and the receiver may send along with the acknowledgment of a route-record message that creates a source route to be used by the concentrator.

The network may fail to send more packets, if the concentrator receives a new source route or a longer source route in the middle of that message.

Embodiments as disclosed herein provide a method to fragment a message so that a size of the packet will not exceed a maximum size of the packet in the network. Generally speaking, when setting a fragment size for fragmenting a message in a network (e.g. a ZigBee network), a sender that uses source routing can set a size of the fragmented message to be smaller than an available space in a packet, so that subsequent fragments of the message can be sent for example when the available space in the packet shrinks as a result of a new or longer source route.

References are made to the accompanying drawings that form a part hereof, and in which is shown by way of illustration of the embodiments in which the embodiments may be practiced. It is to be understood that the terms used herein are for the purpose of describing the FIGURE and embodiments and should not be regarding as limiting the scope of the present application.

The FIGURE illustrates a method of fragmenting a message in a network, such as in a ZigBee wireless network, so that the message can be sent in the network. A message can be fragmented into one or more fragments (e.g. a first fragment 23). The first fragment 23 of the message may be assembled to a first packet 20 along with, for example, a first MAC header 21 and a first network header 22. The first packet 20 can be transmitted in the network, carrying the first fragment 23 of the message. The first packet 20 may have a maximum space.

The first packet 20 is sent over the wireless network. The first packet 20 contains a first MAC header 21, a first network header 22 and the first fragment 23 of the message. A size of the first fragment 23 that can be assembled into the first packet 20 (i.e. an available space of the first packet 20 for a fragment) may be determined by subtracting sizes of the first MAC header 21 and the first network header 22 from the maximum space. It is to be appreciated that other data may be included in the first packet 20.

After the source route changes to include more nodes than were in the first packet 20, for example, in the ZigBee network, the first packet 20 may become a later packet 30 that may contain a second MAC header 31, a second network header 32, and a second fragment 33 that includes the same fragment as the first fragment 23. However, the second network header 32 may have a header size that is larger than the first network header 22, due to, for example, a longer source route than the first packet 20. The size of the second MAC header 31 generally does not change from the size of the first MAC header 21 over the wireless network.

To help fit the second MAC header 31, the second network header 32 and the second fragment 33 in the packet 30 after the size of the second network header 32 increases, the first fragment 23 may be configured not to occupy the available space for the first packet 20. As illustrated, the first packet 20 may include a free space 24. In the later packet 30, because source routing may increase the size of, for example, the network header 22, the free space 24 may be occupied, for example by the second fragment 33 to accommodate the relatively larger second network header 32. As a result, even when the size, for example, of the second network header 32 increases, the second MAC address 31, the second network header 32 and the second fragment 33 may still be fitted in the later packet 30.

In some embodiments, the free space 24 may include at least four bytes, which is a space corresponding to two additional nodes in, for example, the ZigBee network. When there is already a source route in the first packet 20, the source routes in a typical network do not generally change in length by more than two nodes. If there is no source route, the free space 24 may be set at a size that is large enough to accommodate a size change in the network header (e.g. the first network header 22) caused by the maximum number of nodes in a source route for the network.

It is to be appreciated that the embodiments disclosed herein can generally be adapted to be used in a packet-based message transmission network, and a size of a portion of the packet may be varied due to, for example, source routing in the network or other reasons.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What claimed is:

1. A method of sending a message in a packet-based network, comprising:
   determining an available space in a first packet;
   determining a fragmented message size for fragmenting the message, wherein the fragmented message is at least 4 bytes smaller than the available space and the at least 4 bytes corresponds to two additional nodes in the packet-based network;
   fragmenting the message into at least one numbered fragmented message, each of the at least one numbered fragmented message has the fragmented message size;
   assembling a first fragmented message into the first packet; and
   sending the first packet over the network.

2. The method of claim 1, wherein the packet-based network is a ZigBee network.

3. The method of claim 1, wherein the packet-based network is used in a wireless building control system.

4. The method of claim 3, wherein the message is an application of the wireless building control system.

5. The method of claim 1, wherein the first packet includes a MAC header and a network header.

6. The method of claim 5, wherein the network header includes a source route.

7. The method of claim 5, further comprising:
   performing source routing in the network;
   updating the network header of the first packet to indicate the source routing; and
   sending the packet with the updated network header over the network.

8. The method of claim 1, further comprising:
   determining a number of nodes over the network, wherein determining a fragmented message size for fragmenting the message includes determining the fragmented message size so that the fragmented message size is smaller than the available space.

9. The method of claim 5, wherein the packet-based network is a ZigBee network, and the network header of the first packet includes a source route.

10. The method of claim 1, further comprising:
    receiving the first packet sent over the network;
    performing source routing in the network with respect to the received packet;
    updating the network header of the first packet to obtain a later packet; and
    sending the later packet over the network.

11. The method of claim 10, wherein the first packet includes a free space, and at least a portion of the free space is occupied in the later packet.

12. A method of sending a message in a packet-based network, comprising:
    determining an available space in a first packet;
    determining a fragmented message size for fragmenting the message, wherein the fragmented message size is smaller than the available space;
    fragmenting the message into at least one numbered fragmented message, each of the at least one numbered fragmented message has the fragmented message size;
    assembling a first fragmented message into the first packet;
    sending the first packet over the network; and
    determining a number of nodes over the network, wherein determining a fragmented message size for fragmenting the message includes determining the fragmented message size so that the fragmented message size is smaller than the available space by 2 bytes per number of nodes.

13. A method of sending a message in a packet-based network, comprising:
   determining an available space in a first packet;
   determining a fragmented message size for fragmenting the message, wherein the fragmented message size is at least 4 bytes smaller than the available space and the at least 4 bytes corresponds to two additional nodes in the packet-based network;
   fragmenting the message into at least one numbered fragmented message, each of the at least one numbered fragmented message has the fragmented message size;
   assembling a first fragmented message into the first packet;
   sending the first packet over the network;
   receiving the first packet sent over the network;
   performing source routing in the network with respect to the received packet;
   updating the network header of the first packet to obtain a later packet; and
   sending the later packet over the network,
   wherein the first packet includes a free space, and at least a portion of the free space is occupied in the later packet.

* * * * *